United States Patent
Boufounos

(10) Patent No.: US 8,392,424 B2
(45) Date of Patent: Mar. 5, 2013

(54) METHOD FOR HIERARCHICAL SIGNAL QUANTIZATION AND HASHING

(75) Inventor: Petros Boufounos, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 170 days.

(21) Appl. No.: 12/861,923

(22) Filed: Aug. 24, 2010

(65) Prior Publication Data
US 2012/0054191 A1    Mar. 1, 2012

(51) Int. Cl.
*G06F 7/00* (2006.01)
*G06F 17/30* (2006.01)

(52) U.S. Cl. .................. 707/741; 707/698; 711/216
(58) Field of Classification Search .............. None
See application file for complete search history.

(56) References Cited

U.S. PATENT DOCUMENTS

| | | | | |
|---|---|---|---|---|
| 4,710,812 A * | 12/1987 | Murakami et al. | ...... | 375/240.13 |
| 7,219,089 B2 * | 5/2007 | Kobayashi et al. | ........... | 1/1 |
| 7,508,491 B2 * | 3/2009 | Tinnemans | ............. | 355/67 |
| 7,574,409 B2 * | 8/2009 | Patinkin | ................. | 706/12 |
| 7,672,358 B2 * | 3/2010 | Abraham et al. | ......... | 375/142 |
| 2004/0001605 A1 * | 1/2004 | Venkatesan et al. | ....... | 382/100 |
| 2005/0154892 A1 * | 7/2005 | Mihcak et al. | .......... | 713/176 |
| 2007/0160121 A1 * | 7/2007 | Abraham et al. | ......... | 375/150 |
| 2007/0217676 A1 * | 9/2007 | Grauman et al. | ........ | 382/170 |
| 2007/0242252 A1 * | 10/2007 | Tinnemans | ............. | 355/67 |
| 2010/0271012 A1 * | 10/2010 | Patterson et al. | ....... | 324/207.15 |

OTHER PUBLICATIONS

"Optimal lower bounds for locality sensitive hashing"; Ryan O'Donnell, Yi Wu, Yuan Zhou; Dec. 2009; Carnegie Mellon University.*

* cited by examiner

*Primary Examiner* — Giovanna Colan
(74) *Attorney, Agent, or Firm* — Dirk Brinkman; Gene Vinokur

(57) ABSTRACT

An inner product if formed from an input signal and a hashing vector, to which a dither scalar is added. A binary digit is produced according to a quantization function, wherein the binary digit is zero or one, and wherein the quantization function is non-monotonic and subject to a sensitivity parameter. The steps are iterated while decreasing the sensitivity parameter until a termination condition is reached.

16 Claims, 1 Drawing Sheet

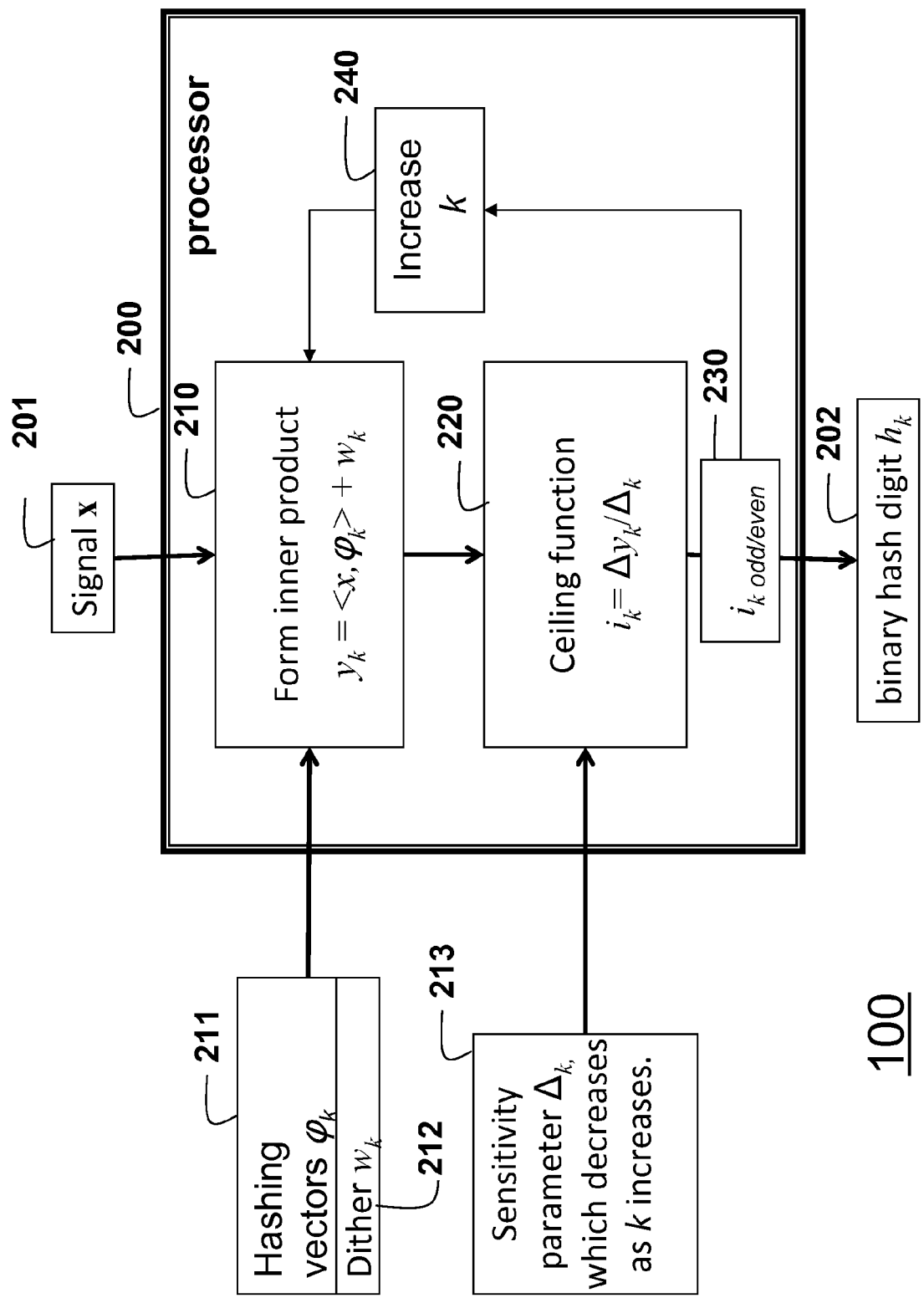

METHOD FOR HIERARCHICAL SIGNAL QUANTIZATION AND HASHING

FIELD OF THE INVENTION

This invention relates generally to representing input data, and more particularly wherein the representation is hierarchical.

BACKGROUND OF THE INVENTION

A hash function, when applied to input data generates an output hash that is a very compact (usually binary) representation of the data. Hashes are very useful for searching and indexing data A conventional hashing method generates a small string of bits from the data. The method provides a probabilistic guarantee that the hashes of two different data are very different, even if the data are very similar but not identical. Thus, searching for a data in a large database can be performed very efficiently by using the hash as an index to the database. Because the hash of the data is significantly smaller than the data, the search is significantly more efficient.

Two hashes are identical only if the data used to generate the hashes are also identical. This feature of conventional hashes makes them suitable for indexing of discrete data such as text, or to provide guarantees that the data have been tampered with.

On the other hand, the same feature makes the hashes unsuitable for indexing data such as time series, sound, biometric data, or images, in which the goal of searching is to retrieve similar but not always identical data. For example, when searching for an image, a slight degraded image is very similar, but not exactly identical to the original image.

Using conventional hashing, the hashes generated for the two images are very different despite the image similarity. Thus, using the conventional hash of one image to search for the other images does not work.

Locality sensitive hashing (LSH) is a general approach to constructing hashes in which the similarity of the hash reflects the similarity of the data being hashed. Using LSH, the hashes generated from two similar data are very similar, while the hashes generated from two dissimilar data are also very dissimilar. Thus, the LSH can be used to search in a database for similar images, or the hash of a fingerprint can be used to search a database for similar fingerprints.

However, the prior state of the art in LSH functions provides methods that produce hashes in which all the bits provide the same information.

SUMMARY OF THE INVENTION

The embodiments of the invention provide a method for hierarchically representing input signals, such as sounds, images, and electromagnetic fields, e.g., radio signals. In the output, the signals are represented as compressed binary sequences of zeros and ones. Then, the sequences can be used to efficiently compare signals with each other, without needing to compare the entire signal. The representation of the signal is in a form of a hash.

In another embodiment the signal is quantized. The processes for generating the hash or the quantized representation are called hashing or quantization, respectively. In the description of the invention, these terms are used interchangeably, because the method is the same for both implementations.

If the represented signal is long enough, the input signal can be substantially recovered from the output hash. A method for recovering the input signal is similar to the method that generated the output.

BRIEF DESCRIPTION OF THE DRAWINGS

FIG. 1 is a block diagram of a method for generating a representation of an input signal according to embodiments of the invention.

DETAILED DESCRIPTION OF THE PREFERRED EMBODIMENT

As shown in FIG. 1, the embodiments of the invention provide a method 100 for hierarchically representing input data signals 201 as a hash or a quantization 202. For the purpose of this description, the terms hash and quantization are used interchangeably.

One embodiment of the invention generates the hash by performing a sequence of steps for K iterations 240 with different sensitivity parameters 214 for each iteration. The method completes when the number of iterations reaches a termination condition. For example, the termination condition is a desired level of accuracy, or a desired number binary digits. Each iteration produces a single binary digit, i.e., a zero or one. The K binary digits produced by iterating the steps form the hash or the quantized representation of the signal. According to embodiments of the invention, the sensitivity parameter $\Delta_k$ 213 is decreased for each iteration as the iteration index K increases 240.

If a hash is generated for multiple signals for the purposes of comparison, or to store in a database, the same method is repeated for all the signals, using the same set of parameters for each signal.

Method Steps

As shown in FIG. 1. The input signal is represented by a vector $x=\{x_0, x_1, \ldots,\}$ 201. The $k^{th}$ binary digit of the output representation is $h_k$ 202. The output is generated as follows. The method can be performed in a processor 200 connected to a memory and input/output interfaces as known in the art.

Step 210 forming an inner product of the vector x with a hashing vector $\phi_k$ 211, and then a constant dither scalar $w_k$ 212 is added:

$$y_k = \langle x_k, \phi_k \rangle + w_k, \qquad (1)$$

where $\phi_k$ and $w_k$ are predetermined. The dither scalar is intentionally applied noise used to randomize any quantization errors and guarantee the accuracy of the hash.

Step 220 determines the ceiling of $y_k/\Delta_k$ by rounding i.e., an integer $i_k$ such that a. $i_k \Delta_k > y_k$, where $\Delta_k$ is the predetermined sensitivity parameter 213.

In step 230, if $i_k$ is odd, then the binary digit $h_k$ is set to zero, otherwise $h_k$ is set to one.

In step 240, for the next iteration, the index k is increased and the next set of parameters $\phi_{k+1}$, $w_{k+1}$, and $\Delta_{k+1}$ are used to produce the next binary digit $h_{k+1}$. The iterations continue until the desired termination condition is reached, e.g., a desired level of accuracy.

Hierarchical Operation

To enable a hierarchical operation, $\Delta_k$ varies for different values of k. Relatively larger values of $\Delta_k$ enable coarse accuracy operations on a larger range of input signals, while relatively small values of $\Delta_k$ enable fine accuracy operations on similar input signals, as described below.

In one embodiment, the method implements a non-monotonic quantization function $h_k = Q(y_k/\Delta_k)$. Another way to implement the function $Q(x)$, for example, is using $Q(x)$ $(\text{sign}(\sin(x/\pi))+1)/2$. The same functionality can be achieved if the digits of the hash are inverted, i.e., if $Q'(x)=1-Q(x)$ is used instead of $Q(x)$, or, equivalently, if all the ones are replaced with zeros, and zeros by ones. Similarly, any shift in the function can also be used, i.e., any $Q''(x)=Q(x-x_o)$ for any $x_o$.

The selection of the parameters can have an effect. In general, the vector $\phi_k$ and dither scalar $w_k$ can arbitrary values. However, it is recommended that all the $\phi_k$, are selected to be incoherent, i.e., the hashing vectors have very small inner products $\langle \phi_k, \phi_l \rangle$, for all $l \neq k$. One way to achieve incoherence is to select $\phi_k$, randomly with independent and identically distributed elements. Similarly, the dither scalars $w_k$ can take any value, but it is recommended that they are selected randomly from a uniform distribution in $[0, \Delta_k]$.

The most important parameter to select is the sensitivity parameter $\Delta_k$. This parameter controls how the hashes distinguish signals from each other. If a distance measure between pairs of signals is considered, (the smaller the distance, the more similar the signals are), then $\Delta_k$ determines how sensitive the hash is to distance changes. Specifically, for small $\Delta_k$ the hash is sensitive to similarity changes when the signals are very similar, but not sensitive to similarity changes for signals that are dissimilar. As $\Delta_k$ becomes larger, the hash becomes more sensitive to signals that are not as similar, but loses some of the sensitivity for signals that are similar. This property is used to construct a hierarchical hash of the signal, where the first few hash coefficients are constructed with a larger value for $\Delta_k$, and the value is decreased for the subsequent values.

Details and recommendations for the selection of $\Delta_k$ are described below.

Hashing for Signal Comparison

An important use of this quantization method according to embodiments of the invention is as a hashing function, i.e., to compare signals with each other and determine which signals are similar. To compare two signals x and x', the hashes are compares, i.e., the respective quantized values h and h'. If the hashes are identical or slightly different, then the signals are similar with a very high probability.

The more the hashes differ, the more dissimilar the signals are. Details on the exact mapping between the similarity of signals and the similarity of their hashes are described below.

In one application, signals in a database are compared. In such an application, the hashes of all the signals form the index to the database. A query signal is presented to the database, and the goal is to find signals similar to the query signal, if they exist.

There are a number of applications for such a system. For example the database can store images or music, and a user is searching for similar images or music.

Alternatively, the database can store biometric identification, such as fingerprint, palm or face characteristics. The query serves to identify users in the database and perform certain action, such as grant access to a system for an authentication database, or to identify suspects in a criminal database.

The signals used for the query can be functions of the original signals, also known as features. For example, for a fingerprint databases, the features being compared might be a minutiae map generated from an fingerprint image. To generate the hash index to the database, the hashes of all the signals in the database, or of their features, are generated and stored, with pointers to the signals that generated the hashes.

Given that some images might be similar and might hash to the same value, each hash index can point to several signals.

Whenever a query signal is presented to the database, the corresponding hash is determined and compared to the hashes in the database.

For each similar or identical hash, the pointers to the corresponding signals are used to recover the signals from the database. Because the hashes are similar, the corresponding signals are also similar. Because the sensitivity of the hashes can be adapted by the choice of $\Delta_k$, a more efficient, hierarchical approach to hashing and database lookup can be used for a very large database. Different hashes of different levels of sensitivity can be determined for all the signals in the database. The coarser hashes have less of a distinguishing ability for similar signals but can be used to quickly disqualify very dissimilar signals. The finer hashes can then be used to refine the results. Thus, the database can also be adaptive to the users selectivity needs, by allowing the user to select the coarse hash to retrieve a large number of similar signals or the finer hash to retrieve much fewer but more selective results. The effectiveness of hashing for indexing is because comparing short hashes is, in terms of computation time, significantly more efficient than comparing entire signals.

Signal Quantization and Reconstruction

Embodiments of the invention can also be used for digital signal acquisition and lossy signal compression. If the number of quantization digits in the output obtained from the input signal is large, the digits contain enough information to reconstruct the input signal.

A digital acquisition system can acquire the signal by forming, using a signal acquisition hardware, the inner product in Eq. (1), and then use the non-monotonic quantization function, subject to the sensitivity parameter, to determine the binary digits zero or one. The process is similar for a compression system.

To reconstruct the input signal, the reconstruction process only needs to locate a signal that hashes to the same binary digits, or almost the same. Lossy signal compression and signal acquisition systems lose some information when acquiring or compressing the signal. This means that the reconstructed signal is similar but not exactly the same as the one acquired or compressed.

According to embodiments of the invention, the accuracy of the reconstruction is controlled by the number K of binary quantization digits that are used and the selection of the hashing parameters, of which the sensitivity parameter $\Delta_k$ is the most important parameter. The trade-offs are between number of bits used to represent the signal, i.e., compression or acquisition efficiency, reconstruction accuracy, and reconstruction computational complexity.

An advantage of the invention is the computational simplicity in the compression and signal acquisition stage. The computational burden is transferred to the decompression and reconstruction stage. Furthermore, the computation of each quantization digits is independent of the other digits. Thus, the method is appropriate for distributed sensing and compression applications, such as distributed sensor networks.

The reconstruction from the quantization digits can also use existing information, often termed side information, about the signal acquired or compressed. This allows even fewer quantized digits to be used, and more efficient compression. The side information can also reduce both the number of quantization digits and the computational burden necessary for an accurate reconstruction.

Analysis of Match Probability

To analyze the method, the probability that two vectors x and x' hash to the same binary digit is determined. For this analysis we assume the $\phi_k$ include independent and identically distributed (i.i.d.) coefficients, normally distributed with zero mean and variance $\sigma^2$. The parameter $\Delta_k$ is predetermined, and that the dither $w_k$ is random, uniformly distributed in the interval $[0, \Delta_k]$.

As a measure of similarity of the two signals, $l_2$ distance, i.e., the $l_2$ norm of their difference, $d(x, x')=|x-x'|_2$, where $$\|x\|_2 = \sqrt{\sum_i x_i^2}.$$

Using this measure, the probability that two signal hash to the same sign is a function of their distance, approximately equal to:

$$P(h_k = h'_k) \approx \begin{cases} 1 - \sqrt{\frac{2}{\pi}} \frac{d(x, x')\sigma}{\Delta_k}, & d(x, x') < \sqrt{\frac{\pi}{8}} \frac{\Delta_k}{\sigma} \\ 0.5, & d(x, x') \geq \sqrt{\frac{\pi}{8}} \frac{\Delta_k}{\sigma}. \end{cases} \quad (2)$$

The total probability of all K hashes is equal is equal to $$P(h = h') = \prod_{k=1}^{K} P(h_k = h'_k), \quad (3)$$

which, if all $\Delta_k$ are equal (and equal to A), is equal to $$P(h = h') \approx \begin{cases} \left(1 - \sqrt{\frac{2}{\pi}} \frac{d(x, x')\sigma}{\Delta}\right)^K, & d(x, x') < \sqrt{\frac{\pi}{8}} \frac{\Delta}{\sigma} \\ 0.5^K, & d(x, x') \geq \sqrt{\frac{\pi}{8}} \frac{\Delta}{\sigma}. \end{cases} \quad (4)$$

Thus, signals that are similar have higher probability of hashing to the same value. As the signal similarity decreases, i.e., their distance $d(x, x')$ increases, the probability that signals hash to the same value also decreases, until it becomes equal to 0.5, i.e., 50%. Beyond that point, the only information provided by the hash is that the distance $d(x, x')$ between the two signals is greater than $$\sqrt{\frac{\pi}{8} \frac{\Delta}{\sigma}}.$$

Sensitivity Parameter $\Delta_k$

The sensitivity parameter $\Delta_k$ is related to the similarity of signals expected in the application of the invention. Specifically, a critical point in behavior of the hash is when the distance of two signals being compared is equal to $$d(x, x') > \sqrt{\frac{\pi}{8} \frac{\Delta}{\sigma}} d(x, x0).$$

Selecting a small $\Delta_k$ provides the ability to distinguish signals even if the signals are very similar because the probability the signals hash to the same value decreases very fast with the signal dissimilarity. However, if the signals are very dissimilar, i.e., greater than $$\sqrt{\frac{\pi}{8} \frac{\Delta}{\sigma}},$$

the hash cannot provide any information about their exact distance, only that it is larger than $$\sqrt{\frac{\pi}{8} \frac{\Delta}{\sigma}}.$$

Furthermore, a small $\Delta_k$ makes signal reconstruction from the hash very difficult, although the reconstructed signal error is small. On the contrary, when selecting a large $\Delta_k$, the hash provides more information on the similarity of more dissimilar signals and permits easier signal reconstruction. However, this is less discriminative for very similar signals, and signals reconstructed from the hash can exhibit a larger reconstruction error.

A reasonable compromise is to select $\Delta_k$ hierarchically. Specifically, using a large $\Delta_k$ to compute the first few hash values allows for a computationally simple rough signal reconstruction or a rough distance estimation, which provides information even for distant signals. Subsequent hash values obtained with smaller $\Delta_k$ can then be used to refine the signal reconstruction or refine the distance information for signals that are more similar.

Applications

The hash of the signal can be used for data mining and information retrieval. This is particularly for efficient indexing and searching of databases containing a variety of signals, such as images, geophysical data, biometric identification, medical images, and others.

An index of the database is constructed by determining the hash of all the database entries, using the method according to embodiments of the invention. When a new image is to be stored in the database, the hash of that image is determined and compared with the hashes of the index hierarchically, by matching the part of the hash with small k and large $\Delta_k$, i.e., the coarse part of the hash, and subsequently refining with the larger k and smaller $\Delta_k$. The images corresponding to the matching hashes are then retrieved and output to the user.

The invention can also be used for data compression. A hash of the signal is determined, as described above, and then the hash is transmitted. The receiver uses any available information for the signal, e.g., side information, together with the hash to reconstruct the signal. For example, if the compressed signal is an image, the receiver uses well-known properties of the image, such as sparsity in its wavelet representation. If the compressed signal is a video sequence, the receiver uses the motion structure of the signal to reconstruct the input video. If the signal is a multispectral or hyperspectral image, then the receiver uses the fact that every spectral band of the image is similar to the nearby bands.

Using such side information, the receiver hierarchically constructs a signal that is consistent with the hash and remains consistent as k increases and $\Delta_k$ becomes smaller. Finally, the invention can be used for signal acquisition as part of an analog-to-digital (A/D) converter. The A/D converter determines the hash of the acquired signal. To reconstruct the signal, the receiver uses the same techniques as the compressed signal receiver, described above. Using the invention for signal acquisition has the additional advantage that the A/D converter also compresses the signal.

EFFECT OF THE INVENTION

Because locality sensitive hashing (LSH) provides similarity information on data, the LSH can also be used as the non-monotonic quantization functions if a sufficient number of bits are produced. Therefore, the invention described herein can also be used for scalar quantization of signals, for example, for signal acquisition or compression.

Prior art scalar quantization uses continuous regions for each quantization point and has performance that does not scale well as more quantized coefficients are added to the representation.

To overcome this issue techniques, Sigma-Delta quantization and Vector quantization can be used, which requires feedback between the coefficients or grouping the coefficients in larger vectors before the quantization.

Using the proposed hash function for quantization, instead, generates scalar quantization regions that are not continuous, which makes scalar quantization significantly more efficient that the prior art LSH. Thus, feedback or grouping of the coefficients can be avoided. The hierarchical nature of the hash function further allows for easy reconstruction when from quantized data.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for representing an input signal, comprising the steps of:
   forming an inner product of an input signal and a hashing vector;
   adding a dither scalar to the inner product;
   producing a binary digit according to a quantization function, wherein the binary digit is zero or one, and wherein the quantization function is non-monotonic and subject to a sensitivity parameter; and
   iterating the forming, adding, and producing steps while decreasing the sensitivity parameter until a termination condition is reached, and wherein each iteration reproduces one binary digit, wherein the steps are performed in a processor.

2. The method claim 1 wherein the producing step further comprises;
   scaling the inner product by the sensitivity parameter to produce a scaled inner product; and
   rounding the scaled inner product to producing a result, wherein the binary digit is zero if the result is odd, and one if the result is even.

3. The method in claim 1 further comprising:
   constructing a hierarchical index to a signal database using the binary digits; and
   searching the signal data base for similar signals.

4. The method in claim 1, wherein the binary digits compress the input signal.

5. The method in claim 1, wherein the binary digits quantize the input signal.

6. The method of claim 1, wherein a representation of the input signal is hierarchical.

7. The method of claim 1, wherein the step of the method are applied to a plurality of signals for comparing the input signals, and the hashing vector, the dither scalar, and the sensitivity parameter are the same for each input signal.

8. The method of claim 2, wherein the rounding uses a ceiling function.

9. The method of claim 1, wherein the termination condition is a desired level of accuracy.

10. The method of claim 1, wherein the hashing vectors used during the iterations are incoherent.

11. The method of claim 1, further comprising:
    reconstructing the input signal from the binary digits.

12. The method of claim 1, wherein the input signal is an image.

13. The method of claim 1, wherein the input signal is an audio signal.

14. The method of claim 1, wherein the input signal is a biometric identification.

15. The method of claim 11, wherein the reconstructing uses side information.

16. A method for representing an input signal, comprising the steps of:
    forming an inner product of an input signal $x=\{x_0, x_1, \ldots,\}$ and a hashing vector $\phi_k$, and adding a dither scalar $w_k$ to the inner product according to
    $$y_k = \langle x_k, \phi_k \rangle + w_k;$$
    determining an integer $i_k$ such that $i_k \Delta_k < y_k$, where $\Delta_k$ is a sensitivity parameter; and
    setting $h_k$ to zero if $i_k$ is odd, and otherwise setting $h_k$ to one, wherein $h_k$ is a $k^{th}$ binary digit of a representation of the input signal, and repeating the forming, determining and setting steps for K iterations while decreasing the sensitivity parameter $\Delta_k$, wherein the steps are performed in a processor.

* * * * *